United States Patent Office 3,431,208
Patented Mar. 4, 1969

3,431,208
DENTURE SPRAY
George A. Bailey, Mountainside, N.J., assignor to Schering Corporation, Bloomfield, N.J., a corporation of New Jersey
No Drawing. Filed Nov. 17, 1965, Ser. No. 508,377
U.S. Cl. 252—106
Int. Cl. C11d 3/48
2 Claims

ABSTRACT OF THE DISCLOSURE

Denture odor is alleviated by spraying the denture with a composition comprising 0.05–1.0% by weight of an orally acceptable germicide, 0.5–5.0% by weight of a film-forming hydrodural polymer and a mutual solvent in an amount sufficient to equal 100% by weight.

---

The present invention relates to denture sprays and to methods for using such sprays to alleviate denture breath.

The unpleasant breath or mouth odor common to denture wearers is termed denture breath and is attributed to the action of microorganisms in the mouth of the wearer. Conventional approaches to controlling denture breath include soaking the denture in a disinfectant cleansing solution when not in use and/or washing the mouth cavity with antiseptic solutions. The benefits obtained by such approaches are short lived because any residual germicide present is rapidly dissipated in the mouth.

It is a principal object of the present invention to provide a long acting denture spray composition useful for the alleviation of denture breath.

It is a further object of the invention to provide a denture spray composition in a form convenient and pleasant to use.

It is yet another object of the present invention to provide a method for the sustained alleviation of denture breath.

These and other objects and advantages of the present invention are provided by a dental spray composition having the following formulation in percent w./v.:

| | Percent |
|---|---|
| Orally acceptable germicide | 0.05–1.0 |
| Film-forming hydrodural polymer | 0.5–5 |
| Solvent to 100 percent. | |

The denture spray composition preferably contains a small amount of a synthetic sweetening agent and a flavoring agent.

The present invention also contemplates a method of alleviating denture breath which comprises spraying the denture with the denture spray compositions herein described.

A more complete understanding of the nature and scope of the invention will be found in the following detailed description, together with preferred embodiments as set forth in the following examples:

Example I

A solution is prepared by adding the following ingredients in the order listed to the alcohol solvent:

| Ingredient: | Percent w./v. |
|---|---|
| Cetylpyridinium chloride, USP | 0.1 |
| Polyvinylpyrrolidone (Plasdone K-29-32) average molecular weight 40,000 | 1.0 |
| Sodium saccharin, USP | 0.05 |
| Imitation cinnamon bark oil V-12326 (IFF) | 0.2 |
| Ethyl alcohol, USP, q.s. to 100. | |

This solution is particularly adapted to spraying on dentures by means of a squeeze bottle or piston-type pump bottle.

Example II

A solution particularly adapted for spraying from a pressure package dispenser as an aerosol is prepared by adding the ingredients listed below to 90% of the alcohol and then adding the remaining alcohol q.s. 100%:

| Ingredient: | Percent w./v. |
|---|---|
| Cetylpyridinium chloride, USP | 0.17 |
| Polyvinylpyrrolidone (Plasdone K-29-32 Antara chemicals) | 1.70 |
| Saccharin sodium, USP | 0.08 |
| Imitation cinnamon bark oil V-12326 (IFF) | 0.74 |
| Ethyl alcohol, USP | 97.31 |
| Total | 100.00 |

The resultant concentrate is filtered through a #1 Ertel pad and filled into appropriate pressure package dispensers. The dispensers are then filled with the propellant charge as follows:

| | Weight percent |
|---|---|
| Propellant | 60–65 |
| Concentrate | 35–40 |
| Total | 100 |

The particular propellant employed in the above example was a 10/90 mixture of dichlorodifluoromethane/dichlorotetrafluoroethane. Generally any of the commercially available propellants or propellant mixtures may be substituted for these mixed propellants such as the following propellants and combinations thereof:

Propellant 11—trichlorofluoromethane, Propellant 12—dichlorodifluoromethane, Propellant 113—trichlorotrifluoroethane, Propellant 114—dichlorotetrafluoroethane, Propellent 22—chlorodifluoromethane, Propellant 142B—chlorodifluoroethane, Propellant 152A—difluoroethane, propane, vinyl chloride, butane, isobutane, pentane, isopentane, hexane, chlorothene, methylene chloride, methyl chloride, nitrous oxide, carbon dioxide, nitrogen.

While the germicide exemplified for use in the present invention is cetylpyridinium chloride, any orally acceptable germicide may be employed. Quaternary ammonium salts constitute a preferred class of germicides and may be utilized as the halide, sulfate, acetate or other commonly available anion. The cation portion of the molecule may be of the tetraalkyl type wherein one or two of the alkyl groups may be of somewhat longer chain length such as lauryl or palmityl. Or the cation may contain a benzene or substituted benzene grouping such as benzalkonium and benzethonium salts. Quaternary ammonium compounds wherein the nitrogen is part of a heterocyclic ring, such as cetylpyridinium salts, are preferred.

Another commonly available class of germinicides that may be utilized in the invention are those of the phenol type such as hexachlorophene, hexylresorcinol, bithionol, para-chloro-meta- xylenol, et cetera. Other classes of germicides include iodine complexes such as the iodophors, and mecurials such as phenyl mercuric salts and alkyl-mercuri-thiosalicylate salts. This list is meant only to illustrate and not to limit the invention; other suitable germicides will suggest themselves to those skilled in the art.

Polyvinylpyrrolidone is the preferred film-forming hydrodural polymer for use in the present invention. Hydrodural polymers are polymers which, while not readily soluble and incapable of true solution in water, are hydrophilic and susceptible to suspension or colloidal solution in water. Representative hydrodural polymers are the synthetic polymers such as polyvinylpyrrolidone, polyacrylic acid and salts thereof, polyvinyl alcohol and the like, natural gums such as tragacanth and alginate gums and the like, and other polysaccharides such as plasticized cellulose, carbomethoxy cellulose, hydroxyethyl starch, and the like.

The polymers suitable for use in the present invention form films on evaporation of the solvent after solutions containing them have been sprayed onto the denture to be protected. The germicidal ingredient is trapped within the film and is protected from being washed away prematurely by the aqueous juices present in the mouth. The germicide present in the film is gradually released as the polymer film is worn away by mechanical action or slowly leached out by the liquids present in the mouth cavity. The beneficial effects of the germicide are thereby made long lasting and the process of applying such a composition to the denture alleviates denture breath for extended periods of time.

A small amount of a synthetic sweetening agent such as sodium saccharin may be added to the denture spray composition in order to make the treated denture more acceptable to the wearer. A somewhat larger amount of a conventional flavoring agent, extract or oil may also be added in order to provide a refreshing flavor and to provide long-lasting breath sweetening effects. This sweetening and refreshing action occurs at the same time the germicidal ingredient is being released to control the microorganisms which would ordinarily produce an undesirable mouth odor.

The compositions of the invention are designed for spraying onto dentures by either mechanical or aerosol means. Thus, the compositions of the invention are solutions containing the germicide and the film-forming hydrodural polymer, and preferably a synthetic sweetening agent and a flavoring agent. Ethyl alcohol is the preferred solvent, among other reasons, because of its ability to dissolve mutually the above materials and to form a particularly desirable film on evaporation after spraying onto dentures. However, other organic solvents and water may also be employed as the solvent in these compositions.

In final form for spraying, the solutions should contain about 0.25–5.0% of the film-forming hydrodural polymer and 0.05–1.0% of the germicide with about 8.05–1.0% of the germicide and 1.0% of the polymer being preferred. The concentrations employed will vary depending on the nature of the specific germicides and polymers being formulated. In general, more of the active materials are provided in concentrates designated for pressure package dispensers to compensate for subsequent dilution with the propellant.

The dentures to be protected against denture breath may be sprayed in or out of the mouth with the compositions of the invention using any suitable mechanical or aerosol spray device or container. Such spraying materially reduces the undesirable odor attributed to the wearing of dentures for significantly greater periods of time as compared to the results obtained with polymer-free germicidal solutions.

Since the compositions of the invention, directly or indirectly, are intended for oral use, the materials utilized should be non-toxic and be otherwise harmless to the body even on repeated use. In construing the term orally acceptable with respect to the germicidal ingredient, consideration should be given to the fact that only minimal quantities of the germicide will be present on the dentures and in the oral cavity at any given time.

Certain preferred embodiments of the present invention have been disclosed for the purpose of illustrating the invention. It is evident that various changes and modifications may be made without departing from the scope and the spirit of the present invention. The invention is as described in the appended claims:

I claim:
1. A method of alleviating denture odor which comprises spraying the denture with a composition consisting essentially of 0.05–1.0% by weight of cetylpyridinium chloride, 0.5–5.0% by weight of polyvinylpyrrolidone and ethyl alcohol in an amount sufficient to equal 100% by weight.
2. A method according to claim 1 wherein the composition contains small amounts of a synthetic sweetening agent and a flavoring agent.

References Cited

UNITED STATES PATENTS

| | | | |
|---|---|---|---|
| 2,295,504 | 9/1942 | Shelton | 167—22 |
| 3,073,794 | 1/1963 | Stoner | 167—65 |
| 3,089,818 | 5/1963 | Stone | 167—65 |
| 3,147,182 | 9/1964 | Masci et al. | 167—22 |

OTHER REFERENCES

The Chemical Formulary, Bennett (I), vol. II, D. Van Nostrand Co., New York, 1935 p. 355.

The Chemical Formulary, Bennett (II), vol. 1, D. Van Nostrand Co., New York, 1933, pp. 384–385.

The Chemical Formulary, Bennett (III), vol XII, Chemical Publishing Company, New York, 1965 pp. 208–210.

LEON D. ROSDOL, *Primary Examiner.*

P. E. WILLIS, *Assistant Examiner.*

U.S. Cl. X.R.

167—93